(12) United States Patent
Imai

(10) Patent No.: US 8,477,439 B2
(45) Date of Patent: Jul. 2, 2013

(54) IMAGE DISPLAY DEVICE

(75) Inventor: Hiroshi Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 434 days.

(21) Appl. No.: 12/296,249

(22) PCT Filed: Apr. 4, 2007

(86) PCT No.: PCT/JP2007/057570
§ 371 (c)(1),
(2), (4) Date: Oct. 6, 2008

(87) PCT Pub. No.: WO2007/116910
PCT Pub. Date: Oct. 18, 2007

(65) Prior Publication Data
US 2009/0059366 A1  Mar. 5, 2009

(30) Foreign Application Priority Data

Apr. 7, 2006 (JP) ................................ 2006-106996
Nov. 30, 2006 (JP) ................................ 2006-323615

(51) Int. Cl.
*G02B 5/04* (2006.01)

(52) U.S. Cl.
USPC ............................................. 359/834; 353/81

(58) Field of Classification Search
USPC .................... 359/831, 833–834, 837; 353/33, 353/81; 362/620, 626
See application file for complete search history.

(56) References Cited

U.S. PATENT DOCUMENTS

| | | | | |
|---|---|---|---|---|
| 5,321,259 A | * | 6/1994 | Morgan | 250/236 |
| 5,909,259 A | * | 6/1999 | Ishino | 349/9 |
| 6,483,482 B1 | * | 11/2002 | Kim | 345/3.1 |
| 2004/0080938 A1 | * | 4/2004 | Holman et al. | 362/231 |
| 2005/0276071 A1 | * | 12/2005 | Sasagawa et al. | 362/607 |

FOREIGN PATENT DOCUMENTS

| | | |
|---|---|---|
| CN | 1275760 A | 12/2000 |
| JP | 61138287 A | 6/1986 |
| JP | 863110 A | 3/1996 |
| JP | 10-020270 A | 1/1998 |
| JP | 2000-180964 A | 6/2000 |
| JP | 2001-005414 A | 1/2001 |
| JP | 2001-147486 A | 5/2001 |
| JP | 2001-356410 A | 12/2001 |
| JP | 2003157031 A | 5/2003 |
| JP | 2004-524551 A | 8/2004 |
| JP | 2005-003989 A | 1/2005 |
| WO | 2004036297 A1 | 4/2004 |

OTHER PUBLICATIONS

Japanese Office Action dated Jul. 24, 2012 issued by the Japanese Patent Office in counterpart Japanese Application No. 2008-509866.

* cited by examiner

*Primary Examiner* — Jennifer L. Doak
(74) *Attorney, Agent, or Firm* — Sughrue Mion, PLLC

(57) ABSTRACT

An image display device capable of maintaining continuity of images of adjacent image display elements on a display screen that is composed of a plurality of image display element includes image display elements (1, 2) and a prism (3). The prism (3) is an L-shaped prism having two planar surfaces, and image display elements (1, 2,) are arranged on the portion of the prism that corresponds to the rear side as seen from the viewing direction (9). Image display elements (1, 2) are arranged such that the virtual images (5, 6) of the image display portions of each are optically continuously connected in the prism (3).

14 Claims, 15 Drawing Sheets

IMAGE DISPLAY DEVICE

TECHNICAL FIELD

The present invention relates to an image display device in which a plurality of image display elements composed of a plurality of picture elements, such as, for example, flat panels of which liquid crystal panels are representative, are arranged to form a display screen.

BACKGROUND ART

Recent years has seen an abundance of research and development relating to image display devices that are provided with a plurality of flat panels, of which liquid crystal panels are representative, and that join together and display the images formed by each of the flat panels. In this type of image display device, non-display portions that are incapable of image display, such as the frame portion or portions on which drive circuits are mounted, are typically present on the ends of the flat panels. Due to the existence of these non-display portions, a display screen that is formed by simply lining up a plurality of flat panels will be divided by the non-display portions between the flat panels, resulting in the drawback of a loss of continuity of images in the planar direction of the screen.

In response, an image display device capable of maintaining the continuity of an image in the planar direction of a display screen has been proposed. FIG. 1A shows the configuration of an image display device disclosed in JP-A-2001-147486 (hereinbelow referred to as "Patent Document 1"), and FIG. 1B shows the configuration of an image display device disclosed in JP-T-2004-524551 (hereinbelow referred to as "Patent Document 2").

The image display device shown in FIG. 1A is composed of two liquid crystal displays (LCD) 101 juxtaposed on the same plane and two lens arrays 102 arranged on the display surface side of these LCD 101. Lens arrays 102 include a plurality of lenses provided for each picture element of LCD 101, and these lenses project the images of each picture element of LCD 101 onto screen 103. The image of each picture element that is cast onto screen 103 has overlapping portions 104 that overlap with adjacent picture elements. The formation of these overlapping portions 104 maintains continuity in the planar direction of the image projected onto screen 103.

In the image display device shown in FIG. 1B, coverplate assembly 111 is arranged above display region 112, and the formation of a lens body on the end portion of cover plate assembly 111 optically eliminates the image non-display portion (optically inactive region 113) of display region 112. Picture elements of the end portion close to the image non-display portion (optically inactive region 113) of display region 112 are designed such that the picture element pitch decreases with approach to the end in accordance with the refraction conditions of the lens body of cover plate assembly 111.

A three-dimensional display device that is currently receiving attention as a stereoscopic display device that employs flat panel displays such as liquid crystal panels realizes stereoscopic vision by spatially separating and presenting to the right eye and left eye a plurality of images having binocular parallax by means of lenticular lenses and a parallax barrier. This device has the advantage of not requiring the viewer to wear special glasses (refer to Okoshi Takanori, *Three-Dimensional Imaging Techniques*, Asakura Shoten).

One stereoscopic image generation method for raising the stereoscopic vision effect is a method of displaying by effecting perspective-projection conversion in a direction oblique to the axis of vision (refer to U.S. Pat. No. 6,389,236). FIG. 2 is an explanatory view for this stereoscopic image generation method.

In the stereoscopic image generation method shown in FIG. 2, images corresponding to each of right-eye viewpoint 121 and left-eye viewpoint 122 are subjected to perspective-projection conversion as right-eye perspective-projection converted image 123 and left-eye perspective-projection converted image 124 and projected onto image-display plane 125. At this time, right-eye perspective-projection converted image 123 and left-eye perspective-projection converted image 124 that are projected onto image-display plane 125 are assumed to be in a direction oblique to the axis of vision. When this method is used to effect stereoscopic display, stereoscopic image 126 is perceived by the viewer. At this time, the distance between the viewpoint of the viewer and each of the portions of the projected image of stereoscopic image 126 differs within image-display plane 125, and the viewer therefore loses awareness of the image-display plane, producing the effect of reducing the fatigue in binocular stereoscopic viewing. In addition, using this method widens the angle of view and therefore enables a further increase of the stereoscopic view effect and can provide stereoscopic imaging with a greater sense of realism.

Combining a plurality of image display elements at angles of from 90° to 180° between the elements enables the provision of a stereoscopic display device with still greater angle of view. Flat panel displays such as liquid crystal panels are used as the image display elements.

DISCLOSURE OF THE INVENTION

In the image display device disclosed in Patent Document 1, imaging optics such as a lens array or lens body are necessary, and such a display device therefore has the drawback of greater thickness. In addition, the image display devices disclosed in Patent Documents 1 and 2 require the curved-surface processing of lenses and therefore have the drawback of increased design/fabrication costs. In addition to these drawbacks, the image display device disclosed in Patent Document 2 requires the special design/fabrication to particularly reduce the picture element pitch of the end portions of image display elements. Still further, in order to realize a three-dimensional display device that uses elements such as lenticular lenses, the picture element pitch of the end portions of lenticular lenses must, depending on conditions, be made especially small, leading to the drawback of a further increase in cost.

In a device that realized stereoscopic display by joining image display elements composed of two flat-panel displays, the following problems arise due to the existence of non-display portions in which images are not displayed at the ends of image display elements.

FIG. 3 gives a schematic representation of a stereoscopic image that is observed when two image display elements are joined together to realize stereoscopic image display. Image display elements 131 and 132 are juxtaposed such that the angle formed between them is substantially 90°. Picture element 133 on image display element 131 is perceived by viewer 139 as point 136 of a stereoscopic image. Picture element 134 on image display element 132 is perceived by viewer 139 as point 137 of a stereoscopic image. Non-display portions 135 are present on the ends of image display elements 131 and 132, and viewer 139 therefore observes stereoscopic image disappearance portion 138 that corresponds to this non-display portion 135. This stereoscopic image disappearance portion 138 does not contain three-dimensional information and therefore presents an extremely unnatural appearance to viewer 139 and greatly interferes with stereoscopic vision.

It is an object of the present invention to provide a low-cost image display device that can solve the above-described problems and maintain the continuity of the images of adjacent image display elements in a display screen composed of a plurality of image display elements.

To achieve the above-described object, the image display device of the present invention is realized by juxtaposing a plurality of image display elements, each of which including an image-display portion composed of a plurality of picture elements and a non-display portion provided along an end of the image display portion, such that the planes that contain the image display portions intersect each other, the image display device including: a prism that covers at least one image display element that is adjacent of the plurality of image display elements, and the prism includes a surface that emits light from the image display element that is covered by the prism, wherein picture elements at an end of the image display portion of the image display element are arranged at positions reached by light that is incident to the edge of the emission surface of the prism from predetermined viewpoint positions.

In the above-described configuration, at least one of image display elements that are adjacent is covered by the prism. When image display elements that are covered by the prism are viewed from predetermined viewpoint positions, the image light from the image display portions of the image display elements is refracted by the prism. In the present invention, this refraction effect is used. In the present invention, moreover, adjacent image display elements are arranged in a state in which an angle is provided such that the planes of the image display elements intersect each other, and further, the picture elements of the ends of the image display portions of adjacent image display elements are arranged at positions reached by light that is incident to the end of the emission surface of the prism from predetermined viewpoint positions. Thus, when viewed from predetermined viewpoint positions, the images of the image display portions of adjacent image display elements can be viewed without seams (images of the non-display portions).

In addition, the present invention does not necessitate the imaging optics that are conventionally used to realize seamless image display and therefore is free of the problem of increased thickness of the image display device. The present invention further does not require special design/fabrication for decreasing the picture element pitch at the end portions of image display elements and therefore does not call for increased costs.

According to the present invention, the provision of imaging optics or the implementation of special design/fabrication is not required, and as a result, the present invention can provide a thin (in depth) image display device at a lower cost than the related art.

Figure 1A:
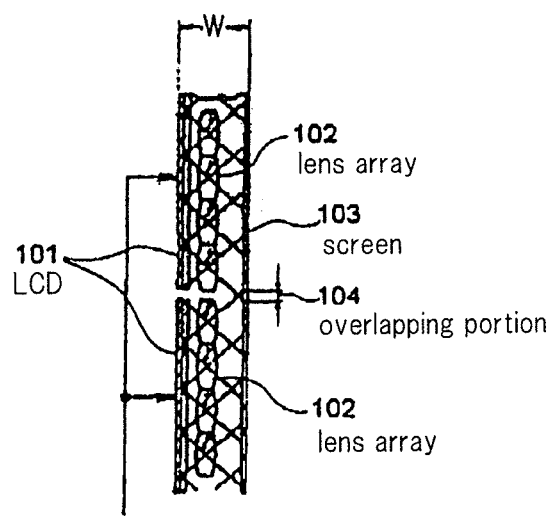
FIG. 1A is a schematic view showing the configuration of an image display device described in JP-A-2001-147486.
Figure 1B:
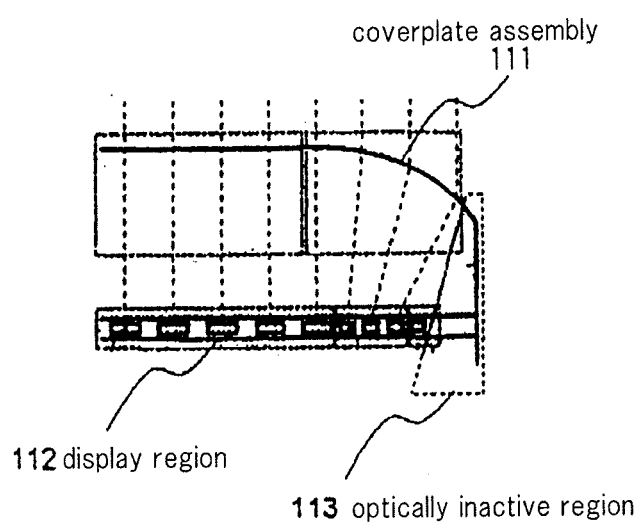
FIG. 1B is a schematic view showing the configuration of the image display device described in JP-T-2004-524551.
Figure 2:
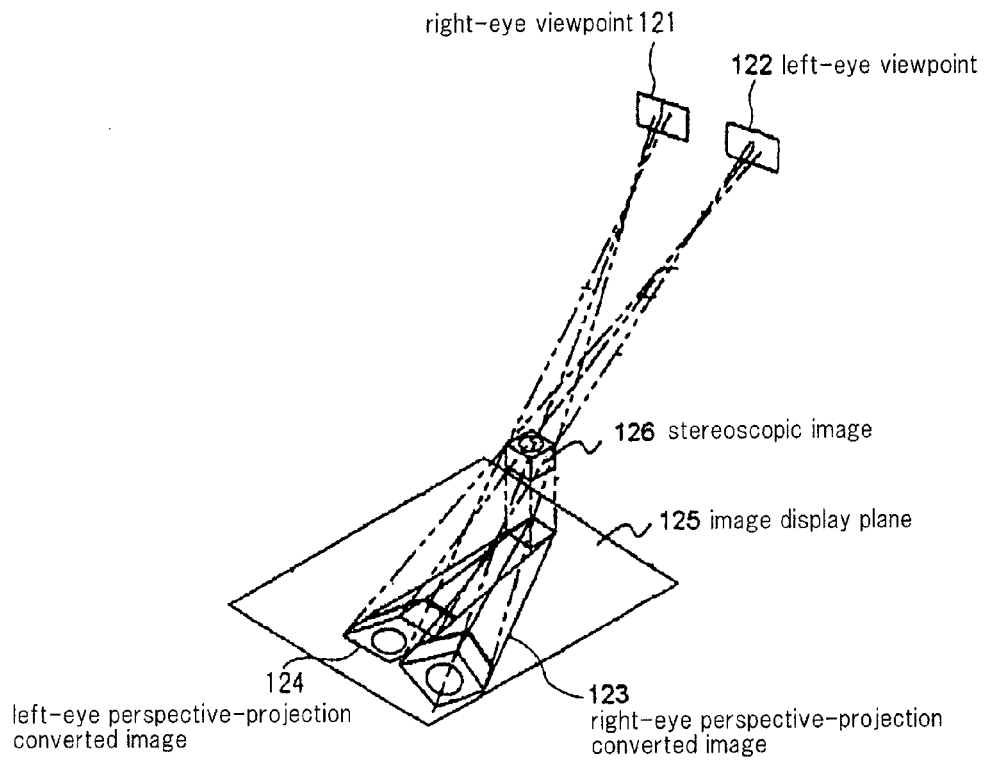
FIG. 2 is an explanatory view of the stereoscopic image generation method described in U.S. Pat. No. 6,389,236.
Figure 3:
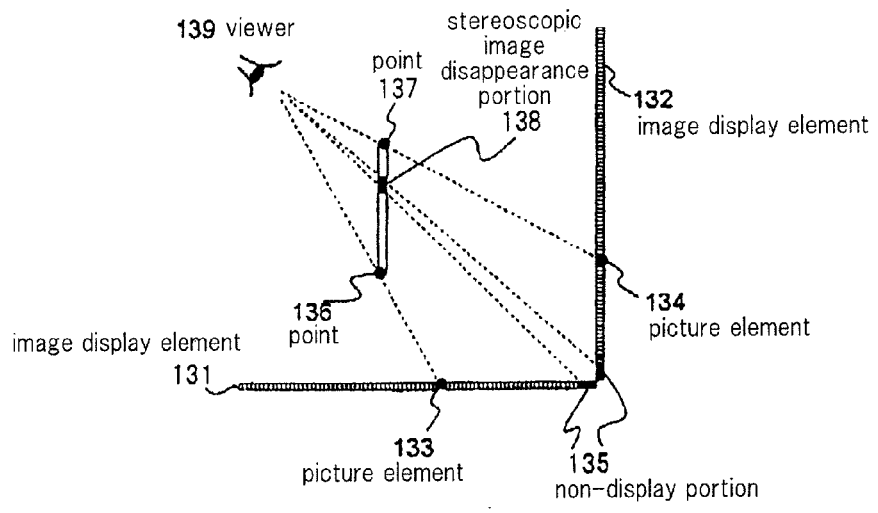
FIG. 3 is a schematic view showing a stereoscopic image that is viewed when stereoscopic image display is implemented by linking together two image display elements.

EXPLANATION OF REFERENCE NUMBERS 1, 2 image display element
1a, 2a image display portion
1b, 2b non-display portion 3 prism
3a, 3b prism part
5, 6 virtual image
9 viewing direction
10 viewer
21, 22 prism surface

BEST MODE FOR CARRYING OUT THE INVENTION

Explanation next regards embodiments of the present invention with reference to the accompanying figures.

First Exemplary Embodiment

Figure 4A:
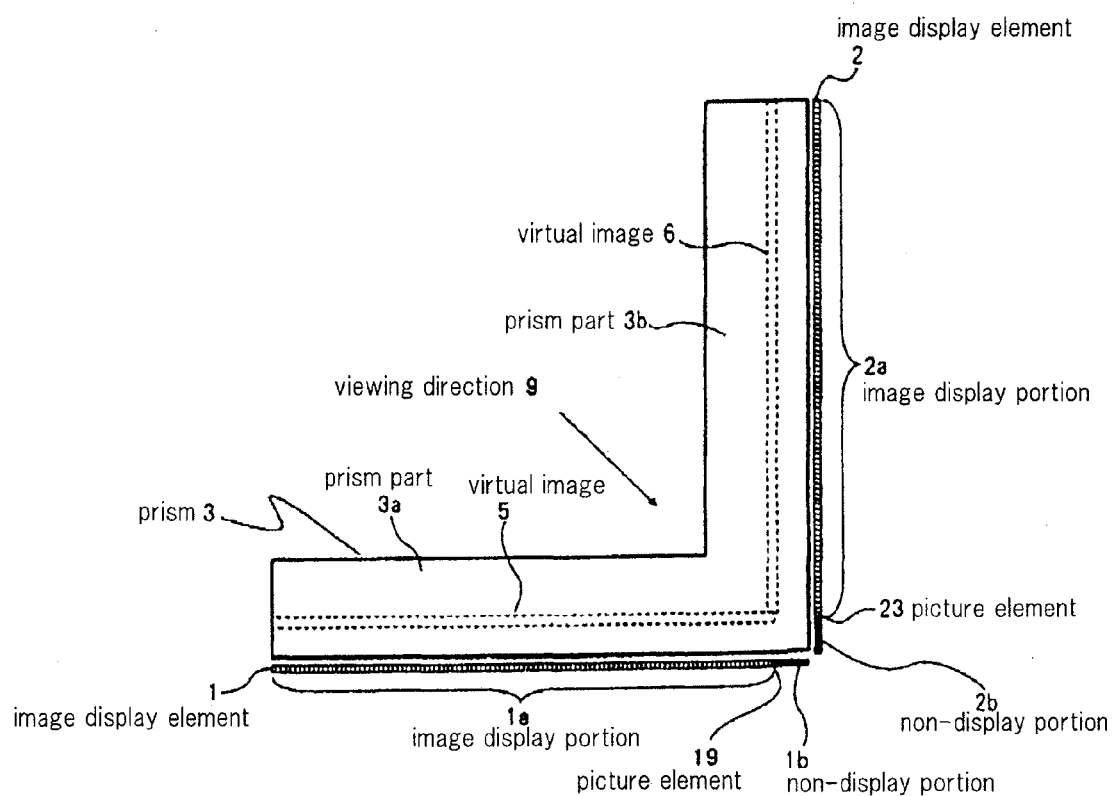
FIG. 4A is a side view showing the first exemplary embodiment of the image display device of the present invention.
Figure 4B:
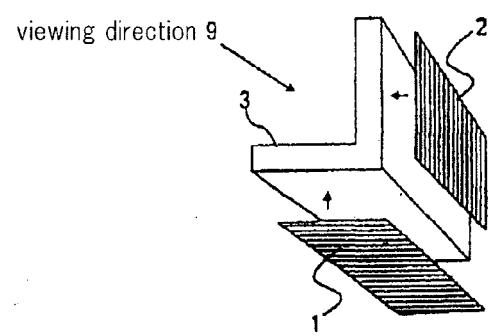
FIG. 4B is an exploded perspective view for explaining the first exemplary embodiment of the image display device of the present invention.

FIG. 4A is a side view showing the first exemplary embodiment of the image display device of the present invention, and FIG. 4B is an exploded perspective view of the image display device.

Referring to FIGS. 4A and 4B, the image display device is made up of two image display elements 1 and 2 and prism 3. Image display elements 1 and 2 are flat panels of which liquid crystal panels are representative. Image display element 1 includes image display portion 1a in which a plurality of picture elements are arranged within the same surface, and non-display portion 1b that is provided along an end of this image display portion 1a. Similarly, image display element 2 also includes image-display portion 2a and non-display portion 2b. Image display elements 1 and 2 are juxtaposed such that their surfaces form an angle of 90°.

Prism 3 has an L-shaped cross-section and includes prism part 3a that covers image display portion 1a of image display element 1 and prism part 3b that covers image display portion 2a of image display element 2. An optical material such as an acrylic, polycarbonate, or glass can be used as the material of prism 3. Prism parts 3a and 3b are parallel plates and have the same thickness. A gap may be provided between image display element 1 and prism part 3a and between image display element 2 and prism part 3b, or these surfaces may be in close contact. In the following explanation, it is assumed that image display elements 1 and 2 and prism parts 3a and 3b are in close contact in the interest of keeping the explanation of the configuration concise.

When image display portions 1a and 2a are viewed through prism 3 from viewing direction 9, image display portions 1a and 2a are observed within prism 3 as virtual images 5 and 6, respectively. These virtual images 5 and 6 make up a single continuous virtual image. In other words, the virtual image of picture element 19 of image display portion 1a that is adjacent to non-display portion 1b and the virtual image of picture element 23 of image display portion 2a that is adjacent to non-display portion 2b are observed in an exactly overlapping state, and non-display portions 1b and 2b are not viewed as virtual images.

When prism 3 is not used and image display portions 2a and 2a are directly viewed from viewing direction 9, non-display portions 1b, 2b are interposed between image display portion 2a and 2a, whereby the display screen that is made up from the images from image display portions 2a and 2a is viewed in a state that is divided by non-display portions 1b and 2b. By means of the image display device of the present embodiment, the virtual images 5 and 6 of image display portions 1a and 2a, when viewed from viewing direction 9, are configured to form a single continuous virtual image inside prism 3, whereby the images of non-display portions 1b and 2b are not visible from the viewer. A more specific explanation of the principles is next presented.

Figure 5:
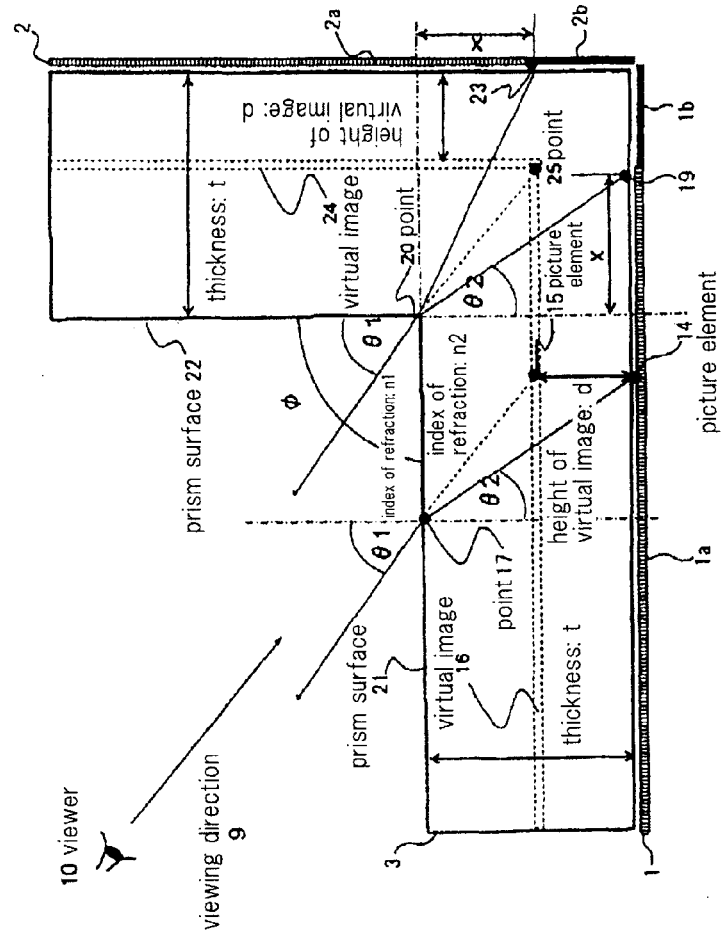
FIG. 5 is an explanatory view of the principles of image display by means of the image display device shown in FIG. 4A.

FIG. 5 is a view for explaining the principles of image display by means of the image display device shown in FIG. 4A. As shown in FIG. 5, when light from picture element 14 on image display element 1 is refracted at prism surface 21 (the surface on the viewing side) and emitted from point 17 on prism surface 21 toward viewer 10 in the direction opposite that of viewing direction 9, the angle formed by the light ray emitted from point 17 and a line perpendicular to prism surface 21 (angle of emergence or angle of refraction) is $\theta_1$, the angle formed by the light ray incident to point 17 from picture element 14 and a line perpendicular to prism surface 21 (angle of incidence) is $\theta_2$, the refractive index outside prism 3 is $n_1$, the refractive index of prism 3 is $n_2$, the thickness of prism 3 is t, and the height of virtual image 15 of picture element 14 is d, the following equations 1 to 3 are realized from Snell's Law and the geometrical relations:

$$n_1 \times \sin \theta_1 = n_2 \times \sin \theta_2 \quad \text{(Equation 1)}$$

$$(t-d) \times \tan \theta_1 = t \times \tan \theta_2 \quad \text{(Equation 2)}$$

$$d = t \times \{1 - (n_1 \times \cos \theta_1)/(n_2 \times \cos \theta_2)\} \quad \text{(Equation 3)}$$

According to Equations 1 to 3, when picture element 14 is viewed from viewing direction 9, picture element 14 is observed as virtual image 15 at a position elevated by height d in prism 3. Based on this principle, image display portions 1a and 2a are viewed as virtual images 16 and 24 at positions elevated by height d in prism 3.

In order for these virtual images 16 and 24 to be viewed as a single continuous virtual image without the interposition of the virtual images of non-display portions 1b and 2b, the arrangement of image display elements 1 and 2 and prism 3 must meet the conditions described hereinbelow.

Explanation first regards the conditions relating to the arrangement of image display element 1 and prism 3.

Image display element 1 is arranged such that light emitted from picture element 19 located at the end of image display portion 1a is refracted at the prism surface 21 side of point 20 on the line of intersection of prism surface 21 and prism surface 22 and directed toward the viewer in the direction opposite viewing direction 9. In other words, when x is the distance to picture element 19 from the position of intersection of image display element 1 and a line perpendicular to prism surface 21 and drawn from point 20, image display element 1 is arranged with respect to prism 3 such that this distance x equals the value given by the following Equation 4:

$$x = t \times \tan \theta_2 \quad \text{(Equation 4)}$$

In the same way, image display element 2 is arranged such that light emitted from picture element 23 located at the end of image display portion 2a is refracted on the prism surface 22 side of point 20 and directed toward viewer in the direction opposite viewing direction 9. Such an arrangement is realized by making the distance x, which is the distance to picture element 23 from the point on image display element 2 that intersects with a line perpendicular to prism surface 22 and drawn from point 20, equal to the value given by Equation 4.

Here, the angle $\phi$ formed by prism surface 21 and prism surface 22 is 90° and the angle of refraction $\theta_1$ is 45°, whereby image display element 1 and image display element 2 have a symmetrical positional relation with respect to the boundary of prism surface 21 and prism surface 22.

By arranging image display elements 1 and 2 as described hereinabove, the virtual image of picture element 19 and the virtual image of picture element 23 when viewed from viewing direction 9 overlap at point 25 on the line of the intersection of virtual image 16 and virtual image 24. In this case, there are no light rays that pass from non-display portions 1*b* and 2*b* and through prism 3 to be directed in the direction of viewer 10. Accordingly, virtual images 16 and 24 of image display portions 1*a* and 2*a* are viewed as one continuous virtual image without the interposition of the virtual images of non-display portions 1*b* and 2*b*.

Figure 6:
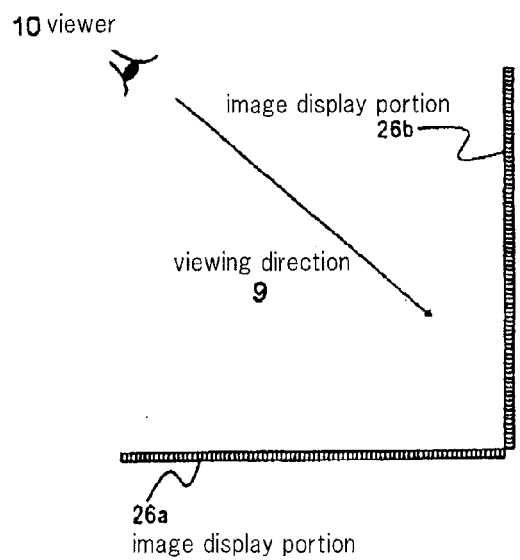
FIG. 6 is a schematic view showing the optical equivalent state of the image display device shown in FIG. 4A.

FIG. 6 is a schematic view showing the optically equivalent state of image display device shown in FIG. 4A. According to the above-described display principles, the virtual image of image display portion 1*a* of image display element 1 and the virtual image of image display portion 2*a* of image display element 2 are viewed as a continuous seamlessly joined virtual image. This state is equivalent to the seamlessly joined state of image display portions 26*a* and 26*b* of the two image display elements as shown in FIG. 6. Image display portions 26*a* and 26*b* correspond to virtual images 5 and 6 shown in FIG. 4A.

In the above-described arrangement, image display elements 1 and 2 are designed such that the non-display portions 1*b* and 2*b* of each do not interfere.

Second Exemplary Embodiment

In the first exemplary embodiment, prism parts 3*a* and 3*b* have the same thickness t and the angle ϕ formed by prism surfaces 21 and 22 is 90°, but the thicknesses of prism parts 3*a* and 3*b* may differ and angle ϕ can be set as appropriate within a range of angles that allows each of the virtual images of the image display portions to be viewed as a single continuous virtual image. The preferable angle range of angle ϕ is at least 90° but less than 180°. Explanation here regards a form using angle ϕ that is set to an angle greater than 90° and prism parts 3*a* and 3*b* that have different thicknesses.

Figure 7:
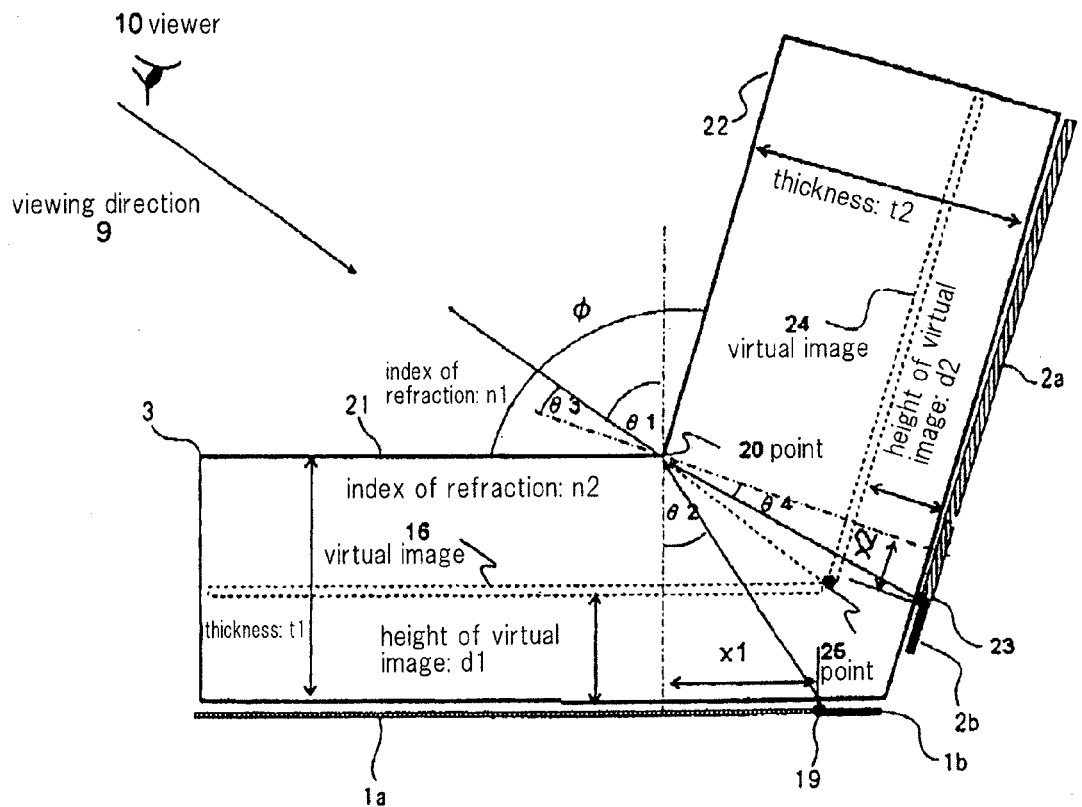
FIG. 7 is a schematic view for explaining the second exemplary embodiment of the image display device of the present invention.

FIG. 7 is a schematic view for explaining the second exemplary embodiment of the image display device of the present invention. The image display device of the present embodiment is of the same basic configuration as the first exemplary embodiment with the exceptions that the thickness t1 of prism part 3*a* is less than thickness t2 of prism part 3*b* and angle ϕ formed by prism surfaces 21 and 22 is greater than 90°. The angle formed by the surfaces of image display elements 1 and 2 is equal to angle ϕ (>90°). In FIG. 7, the same reference numbers are given to elements identical to those shown in FIG. 4A. In the interest of avoiding redundant explanation, only distinctive parts are explained and explanation of configurations that are the same as shown in FIG. 4A has been omitted.

Image display element 1 is arranged such that light emitted from picture element 19 located at the end of image display portion 1*a* is refracted on the prism surface 21 side of point 20 on the line of intersection of prism surface 21 and prism surface 22 and directed toward viewer 10 in the direction opposite viewing direction 9. More specifically, this arrangement was realized as shown below.

In FIG. 7, n2 is the index of refraction of prism 3 and n1 is the index of refraction outside prism 3. θ1 is the angle formed by a light ray of light emitted from point 20 from picture element 19 and a line perpendicular to prism surface 21 (angle of emergence or angle of refraction). θ2 is the angle formed by a light ray that is incident to point 20 of light from picture element 19 and a line perpendicular to prism surface 21 (angle of incidence). If x1 is the distance to picture element 19 from the position on image display element 1 of intersection with a line drawn from point 20 perpendicular to prism surface 21, image display element 1 is arranged with respect to prism 3 such that this distance x1 is the value given by the following Equation 5:

$$x1 = t1 \times \tan \theta 2 \quad \text{(Equation 5)}$$

In addition, image display element 2 is arranged such that light emitted from picture element 23 positioned at the end of image display portion 2*a* is refracted on the prism surface 22 side of point 20 and directed toward viewer 10 in the direction opposite the viewing direction 9. More specifically, this arrangement is realized as shown hereinbelow.

In FIG. 7, θ3 is the angle formed by a light ray emitted from point 20 of light from picture element 23 and a line perpendicular to prism surface 22 (the angle of emergence or the angle of refraction). θ4 is the angle formed by a light ray incident to point 20 of light from picture element 23 and a line perpendicular to prism surface 22 (the angle of incidence). When x2 is the distance to picture element 23 from the position on image display element 2 that intersects with a line drawn from point 20 perpendicular to prism surface 22, image display element 2 is arranged with respect to prism 3 such that this distance x2 is the value given in accordance with the following Equations 6 and 7:

$$n1 \times \sin \theta 3 = n2 \times \sin \theta 4 \quad \text{(Equation 6)}$$

$$x2 = t2 \times \tan \theta 4 \quad \text{(Equation 7)}$$

When image display elements 1 and 2 are arranged with respect to prism 3 as described above, angles of refraction θ1 and θ3 and angle ϕ realize the relation of Equation 8 below:

$$\theta 1 + \theta 3 = 180° - \phi \quad \text{(Equation 8)}$$

Here, the thickness t1 of prism part 3*a* and the thickness t2 of prism part 3*b* may differ as long as the above-described conditions are satisfied. In the configuration shown in FIG. 7, when viewed from viewing direction 9, the virtual image of picture element 19 and the virtual image of picture element 23 overlap at point 25 on the line of intersection of virtual image 16 and virtual image 24. In this case, as in the first exemplary embodiment described hereinabove, there are no light rays that pass from non-display portions 1*b* and 2*b* and through prism 3 to be emitted toward viewer 10, whereby the virtual images 16 and 24 are seen as a single continuous virtual image. In accordance with Equations 1 to 3, the heights of the virtual images of prism parts 3*a* and 3*b* are d1 and d2, respectively.

Third Exemplary Embodiment

Figure 8:
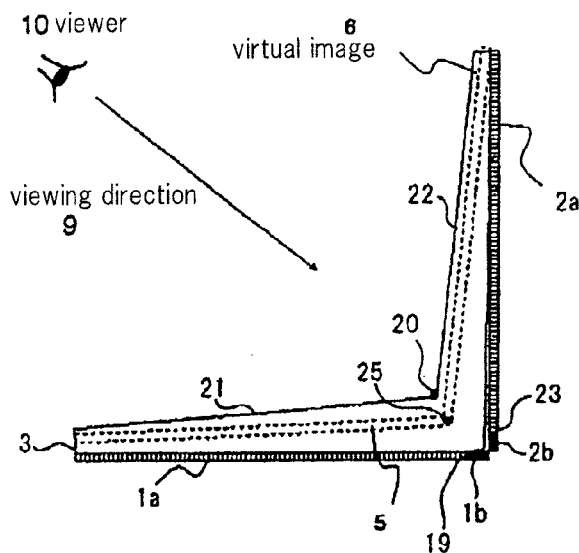
FIG. 8 is a schematic view for explaining the third exemplary embodiment of the image display device of the present invention.

FIG. 8 is a schematic view for explaining the third exemplary embodiment of the image display device of the present invention. The image display device of the present embodiment is basically of the same configuration as the second exemplary embodiment, but differs in that the cross-sectional shape of prism 3 is wedge-shaped and the thicknesses of prism parts 3*a* and 3*b* gradually decrease with progression from the boundary of these prism parts to their ends. The angle formed by the surfaces of image display elements 1 and 2 is set to at least 90° but less than 180°, the angle here being assumed to be 90°. In FIG. 8, components identical to components shown in FIG. 7 are given the same reference numbers.

In the present embodiment as well, image display element 1 is arranged such that light emitted from picture element 19 positioned at the end of image display portion 1*a* is refracted on the prism surface 21 side of point 20 on the line of intersection of prism surface 21 and prism surface 22 and directed toward viewer 10 in the direction opposite viewing direction 9. In addition, image display element 2 is arranged such that light emitted from picture element 23 positioned at the end of image display portion 2*a* is refracted at the prism surface 22 side of point 20 and directed toward viewer 10 in the direction opposite viewing direction 9. By means of this arrangement, when viewed from viewing direction 9, the virtual image of picture element 19 and the virtual image of picture element 23 overlap at point 25 on the line of intersection of virtual image 16 and virtual image 24. In this case, as in the first exemplary embodiment described hereinabove, no light rays pass from non-display portions 1b and 2b and through prism 3 to be emitted toward viewer 10, whereby virtual images 16 and 24 are viewed as a single continuous virtual image.

Fourth Exemplary Embodiment

Figure 9:
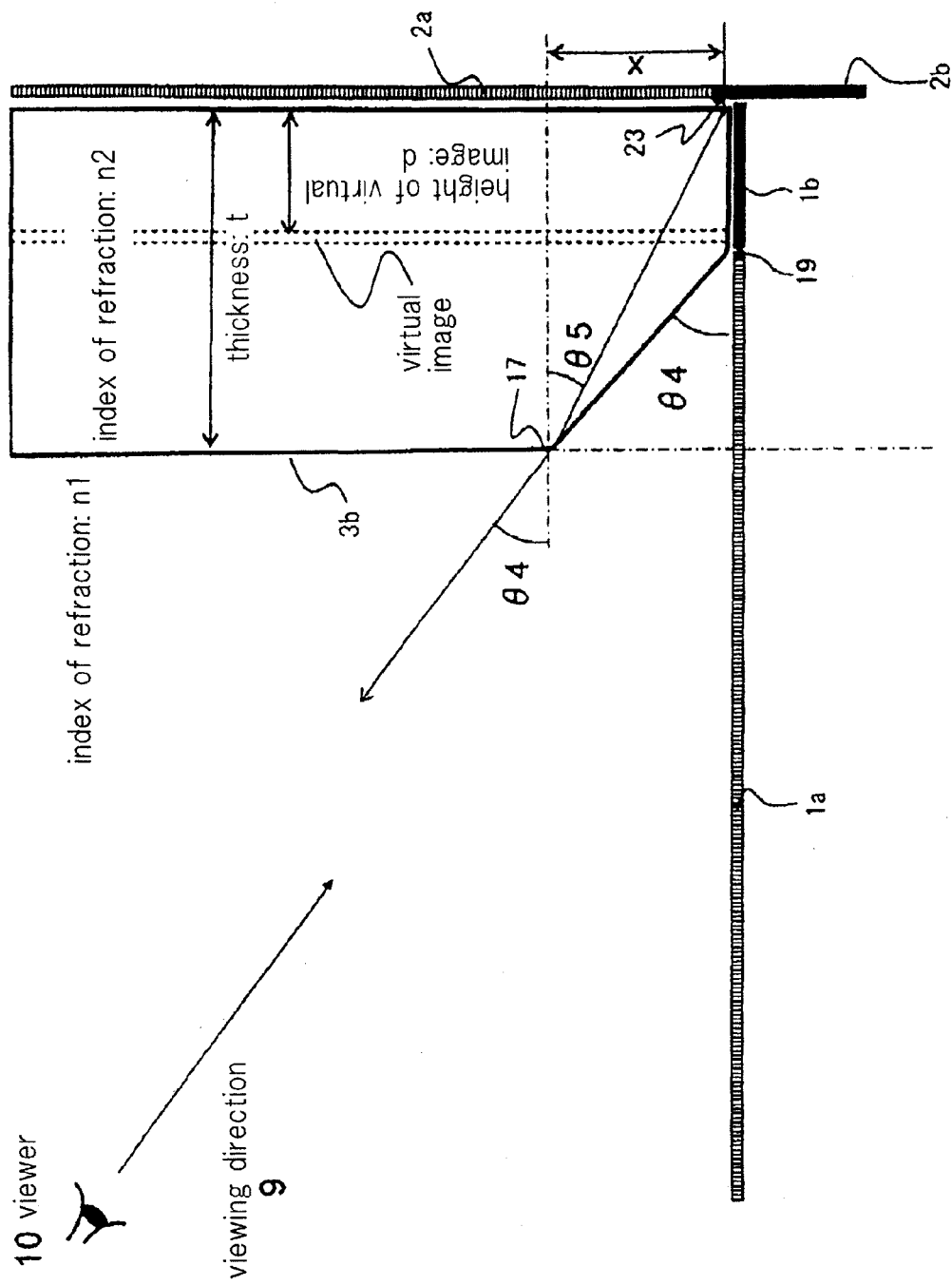
FIG. 9 is a schematic view for explaining the fourth exemplary embodiment of the image display device of the present invention.

FIG. 9 is a schematic view for explaining the fourth exemplary embodiment of the image display device of the present invention. In the image display device of the present embodiment, only image display element 2 of image display elements 1 and 2 is covered by a prism. The configuration is otherwise equivalent to the configuration of the first exemplary embodiment.

The prism is composed of only prism part 3b shown in FIG. 4A, and image display portion 2a of image display element 2 is covered by this prism part 3b. When light from picture element 23 positioned on the end of image display portion 2a is refracted by prism surface 22 (the surface on the side of the viewer) and directed from point 17 of the end of prism surface 22 toward viewer 10 in the direction opposite the viewing direction 9, the angle formed by a light ray directed from point 17 and a line perpendicular to prism surface 22 (the angle of emergence or the angle of refraction) is θ4, the angle formed by a light ray incident to point 17 from picture element 23 and a line perpendicular to prism surface 22 (the angle of incidence) is θ5, the refractive index outside prism part 3b is n1, the refractive index and thickness of prism part 3b are n2 and t, respectively, and the height of virtual image 15 of picture element 23 is d, the above-described Equations 1 to 3 are realized in accordance with Snell's laws and geometrical relations. In this case, when image display portion 2a is viewed by way of prism part 3a from viewing direction 9, image display portion 2a is viewed as virtual image 24 at a position elevated by height d in the prism.

In this embodiment as well, image display element 2 and prism part 3b are arranged such that the distance x to picture element 23 from the position on image display element 2 that intersects with a line drawn from point 17 perpendicular to prism surface 22 is a value given by the above-described Equation 4. The end of prism part 3a is cut to acquire an inclination of angle θ4 with respect to a line perpendicular to prism surface 22 from the prism surface 22 side to the position (height d) of formation of virtual image 24 and cut to be parallel to a line perpendicular to prism surface 22 from the position of virtual image 24 to the surface that covers image display portion 2a. Image display element 1 is arranged such that picture element 19 positioned at the edge of image display portion 1a is adjacent to the end of virtual image 24.

According to the above-described arrangement, light emitted from picture element 23 is refracted at point 17 of the end of prism surface 22 and directed toward the viewer in the direction opposite viewing direction 9. When viewed from viewing direction 9, picture element 19 and the virtual image of picture element 23 are exactly adjacent at point 25 on the line of intersection of the plane that contains image display portion 2a and the plane that contains virtual image 24. In this case, there are no light rays that pass from non-display portions 1b and 2b and through prism 3 to be emitted toward viewer 10, and image display portion 1a and virtual image 24 of image display portion 2a are therefore viewed as a single continuous image.

Fifth Exemplary Embodiment

Figure 10:
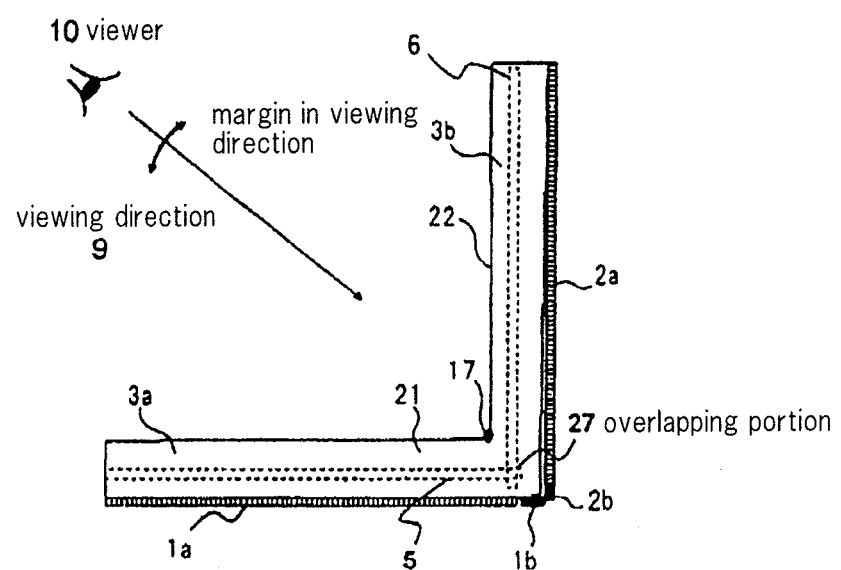
FIG. 10 is a schematic view for explaining the fifth exemplary embodiment of the image display device of the present invention.

FIG. 10 is a schematic view for explaining the fifth exemplary embodiment of the image display device of the present invention. The image display device of the present embodiment is basically of the same configuration as the first exemplary embodiment, but differs in that the image display device is configured such that the virtual images of image display portions 1a and 2a intersect (overlap) at point 25. In FIG. 10, components identical to those shown in FIGS. 4A and 5 are given the same reference numbers.

Image display element 1 is arranged such that light from a picture element on image display portion 1a located nth counting from the end in the direction opposite non-display portion 1b is refracted at prism surface 21 and directed toward viewer 10 in the direction opposite viewing direction 9 from point 17 of the end of prism surface 21. In other words, image display element 1 and prism part 3a are arranged such that distance x to the nth picture element from the position on image display element 1 that intersects with a line drawn from point 17 perpendicular to prism surface 21 is the value given by the above-described Equation 4. In this case, "n" is any number.

In addition, image display element 2 is arranged such that light from the picture element positioned mth from the end of image display portion 2a counting in the direction opposite the direction of non-display portion 2b is refracted at prism surface 22 and directed toward viewer 10 in the direction opposite viewing direction 9 from point 17 of the end of prism surface 22. In other words, image display element 2 and prism part 3b are arranged such that the distance x to the mth picture element from the position on image display element 2 that intersects with a line drawn from point 17 perpendicular to prism surface 22 is equal to a value given by the above-described Equation 4. Here, m is any number.

According to the above-described arrangement, when viewed from viewing direction 9, the virtual image of the nth picture element from the end of image display portion 1a and the virtual image of the mth picture element from the end of image display portion 2a are exactly adjacent at point 25 on the line of intersection of virtual image 16 of image display portion 1a and virtual image 24 of image display portion 2a. In this case, there are no light rays that pass from non-display portions 1b and 2b and through prism 3 to be directed toward viewer 10, whereby the virtual images 16 and 24 of image display portions 1a and 2a are viewed as a single continuous virtual image of an overlapping state (a state that includes overlapping portion 27). In this case, the margin of the viewing direction can be increased to the extent of overlapping portions 27 compared to the first to fourth exemplary embodiments. Here, the margin of the viewing direction means the size of the range in which an image formed by image display portions 1a and 2a can be seen as single continuous image without the interposition of non-display portions 1b and 2b when image display elements 1 and 2 are viewed through prism 3 from viewer 10.

Sixth Exemplary Embodiment

In the image display device of the first to fifth exemplary embodiments, the portion of a prism that covers a non-display portion of an image display element is an unnecessary area in terms of viewing the image formed by the image display element, and the effective use of space can therefore be achieved by forming, for example, a channel in this area. In particular, in the image display devices described in each of the embodiments, components such as drive circuits are provided in the non-display portions of the image display elements, and a certain amount space is therefore preferably provided between the non-display portions and prisms.

Figure 11:
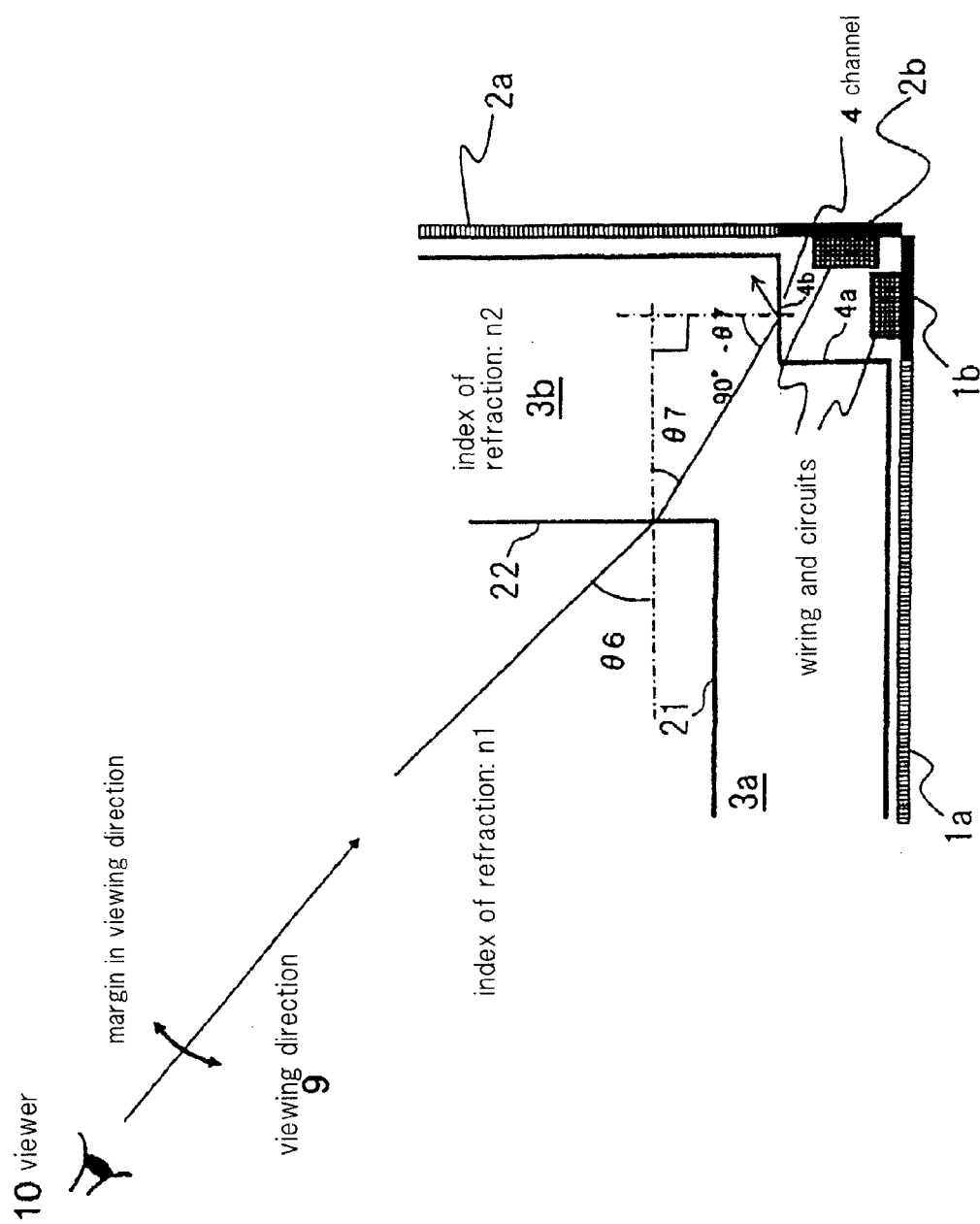
FIG. 11 is a schematic view for explaining the sixth exemplary embodiment of the image display device of the present invention.

FIG. 11 is a schematic view for explaining the sixth exemplary embodiment of the image display device of the present invention. The image display device of the present embodiment is of the same configuration as the first exemplary embodiment with the exception of the formation of channel 4 in the portion of prism 3 that covers non-display portions 1b and 2b of image display elements 1 and 2 in the configuration shown in FIGS. 4A and 5. In FIG. 11, parts that are identical to the first exemplary embodiment are given the same reference numbers.

Channel 4 is provided along the line of intersection of the surface that covers image display element 1 and the surface that covers image display element 2, and this cross-sectional shape of this channel is an L-shape. The channel includes surface 4a that is perpendicular to the surface of image display portion 1a and surface 4b that is perpendicular to the surface of image display portion 2a.

In the image display device of the present embodiment, a condition is assumed in which light that is incident to prism part 3b at angle of incidence θ6 from viewing direction 9, refracted at prism surface 22, and irradiated to surface 4b of the channel is completely reflected at surface 4b. According to this configuration, channel 4 works as an optical regulation part that prevents the emission of light from non-display portions 1b and 2b toward viewer 10, whereby the margin of the angle of view is increased. The action of this optical regulation part is explained in more concrete terms hereinbelow.

When the angle of incidence and the angle of refraction at prism surface 22 are θ6 and θ7, respectively, the angle of incidence of surface 4b is (90°−θ7), the index of refraction n1 outside prism 3 is 1.0, and the index of refraction n2 of prism 3 is 1.5, the following relation is realized:

$$n1 \times \sin\theta6 = n2 \times \sin\theta7$$

The angle θ6 is the angle of view, and in an angle of view range of 0°<θ6<90°, θ7 is within the range 0°<θ7<41.80 (First condition). On the other hand, the condition by which total reflection is realized at surface 4b of channel 4 is: sin (90°−θ7)>n1/n2, and 48.1°>θ7 (Second condition). The first and second conditions are determined regardless of θ6. As long as the first and second conditions are satisfied, total reflection is achieved and channel 4 cannot be seen from viewer 10 regardless of viewing direction. Accordingly, as long as non-display portions 1b and 2b are positioned in channel 4, non-display portions 1b and 2b are invisible to viewer 10.

Channel 4 therefore works to prevent the emission f light from non-display portions 1b and 2b of image display elements 1 and 2 toward the viewing direction. The margin Δθ of the viewing direction in this case is greater than for a configuration that lacks channel 4.

Figure 12A:
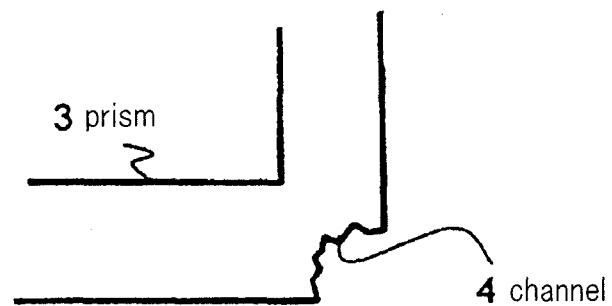
FIG. 12A is a schematic view showing a modification of a channel.
Figure 12B:
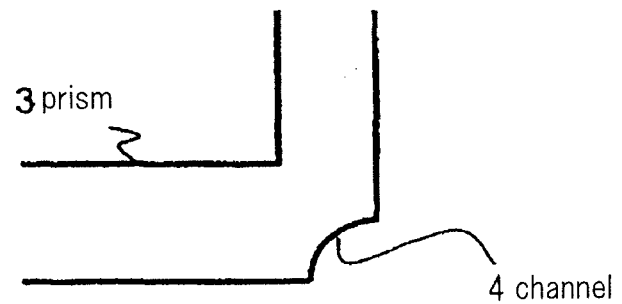
FIG. 12B is a schematic view showing another modification of a channel.

Channel 4 may be of a configuration other than an L-shaped total reflection surface. For example, channel 4 may be configured as a diffusing surface such as shown in FIG. 12A or a curved surface such as shown in FIG. 12B. Alternatively, the surfaces of channel 4 may be formed as black absorption surfaces to absorb light.

Seventh Exemplary Embodiment

Figure 13:
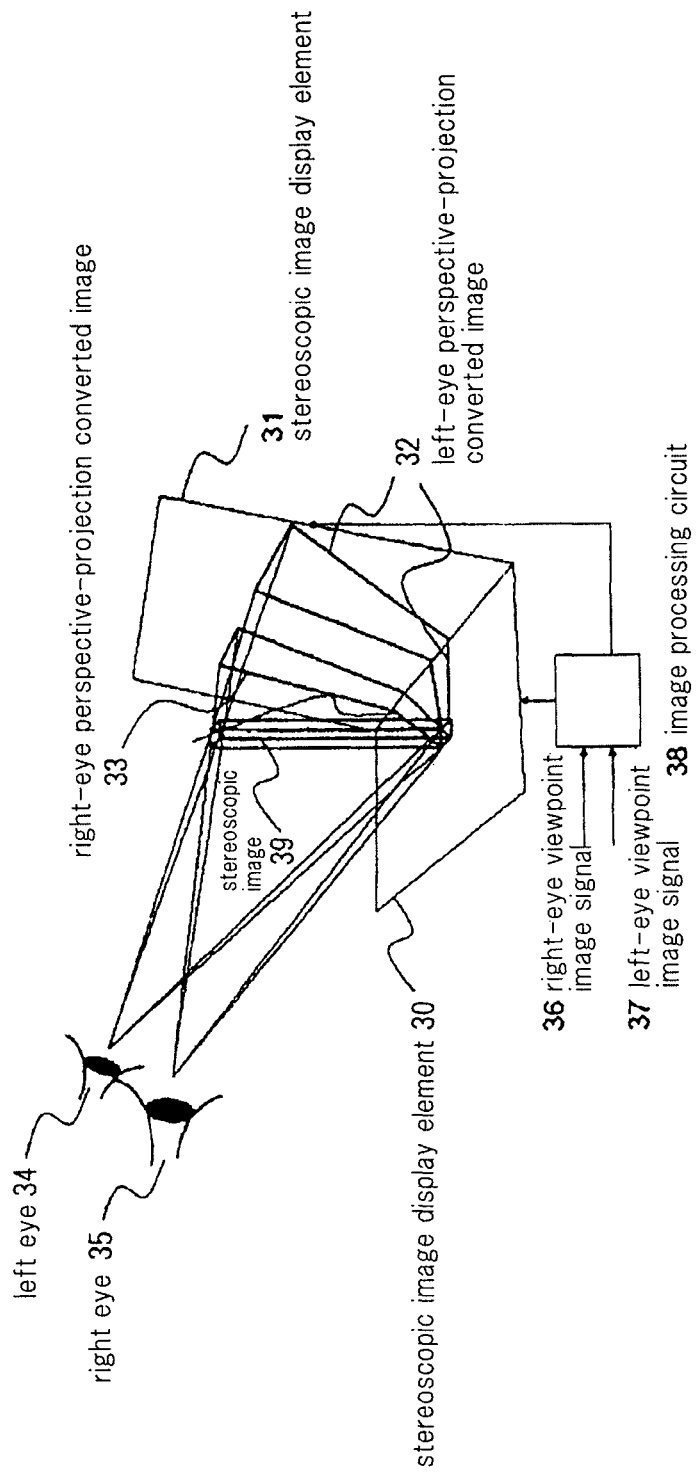
FIG. 13 is a schematic view for explaining the seventh exemplary embodiment of the image display device of the present invention.

FIG. 13 is a schematic view for explaining the seventh exemplary embodiment of the image display device of the present invention. The image display device of the present embodiment includes two stereoscopic image display elements 30 and 31 that constitute a display screen and image processing circuit 38.

Stereoscopic image display elements 30 and 31 are components that apply the configuration of any of the first to sixth exemplary embodiments and are joined at one end such that the non-display portions (seams) cannot be seen when the image display portions are viewed through a prism from the direction of right eye 33 and left eye 34 of the viewer. Here, stereoscopic image display elements 30 and 31 are assumed to be arranged such that their surfaces together form an angle of 90°.

Image processing circuit 38 receives as input right-eye viewpoint image signal 36 relating to the image that corresponds to the right-eye viewpoint and left-eye viewpoint image signal 37 that relates to the image that corresponds to the left-eye viewpoint, and displays an image based on right-eye viewpoint image signal 36 and left-eye viewpoint image signal 37 on a display screen composed of stereoscopic image display elements 30 and 31. Lenticular lenses are adhered to each of the prism surfaces of stereoscopic image display elements 30 and 31, and when viewed from the right eye 33 and left eye 34 directions, a stereoscopic image is seen that is composed of the image based on right-eye viewpoint image signal 36 and the image based on left-eye viewpoint image signal 37.

Explanation next regards an actual example of the image display device of the present embodiment.

As stereoscopic image display elements 30 and 31, color liquid crystal panels were used having 640 picture elements horizontally and 480 picture elements vertically for a screen size of 32 mm horizontally and 50 mm vertically. The non-display portions of the stereoscopic image display elements were 1.8 mm. The lens pitch of the lenticular lens was 100 μm and the number of lenses was 320. The prism was 4 mm thick and formed from transparent acrylic resin (index of refraction: 1.49). The extreme ends of the image display portions of the stereoscopic image display elements were 1.8 mm from the corners of the surfaces of the prism that contact the image display element. When images corresponding to each of the viewpoints of right eye 34 and left eye 35 of the viewer are optically independently presented with a 45°-angle of view under these conditions, three-dimensional viewing is possible to the unaided eye without the need to wear special glasses, and three-dimensional vision is possible without the viewer's perception of the non-display portions (seams) of the two stereoscopic image display elements, stereoscopic image display elements 30 and 31.

Still further, in the image display device of the present embodiment, image processing circuit 38 was able to present moving-picture display of stereoscopic image 39 that was geometrically correct to the viewer in real time by generating right-eye perspective-projection converted image 32 and left-eye perspective-projection converted image 33 that correspond to each of stereoscopic image display elements 30 and 31 from right-eye viewpoint image signal 36 and left-eye viewpoint image signal 37.

Thus, the present embodiment enables the presentation of a stereoscopic image to the viewer and the provision of a stereoscopic display device having high image angle and realism. In addition, the prism may employ a material having higher refractive index than a transparent acrylic resin such as a polycarbonate resin (refractive index: 1.59). The surface of the prism may be subjected to an antireflection coating. As the optics for realizing stereoscopic display, a parallax barrier, a lens array for integral photography, or a pinhole array may also be used.

In addition to color liquid crystal panels, the stereoscopic image display elements may employ various flat display panels such as organic EL panels, plasma display panels, surface-conduction electron-emitter display panels, and electronic paper. Still further, the number of picture elements and the screen size are not limited to those of the above-described example and can be set as appropriate according to design.

Eighth Exemplary Embodiment

Figure 14:
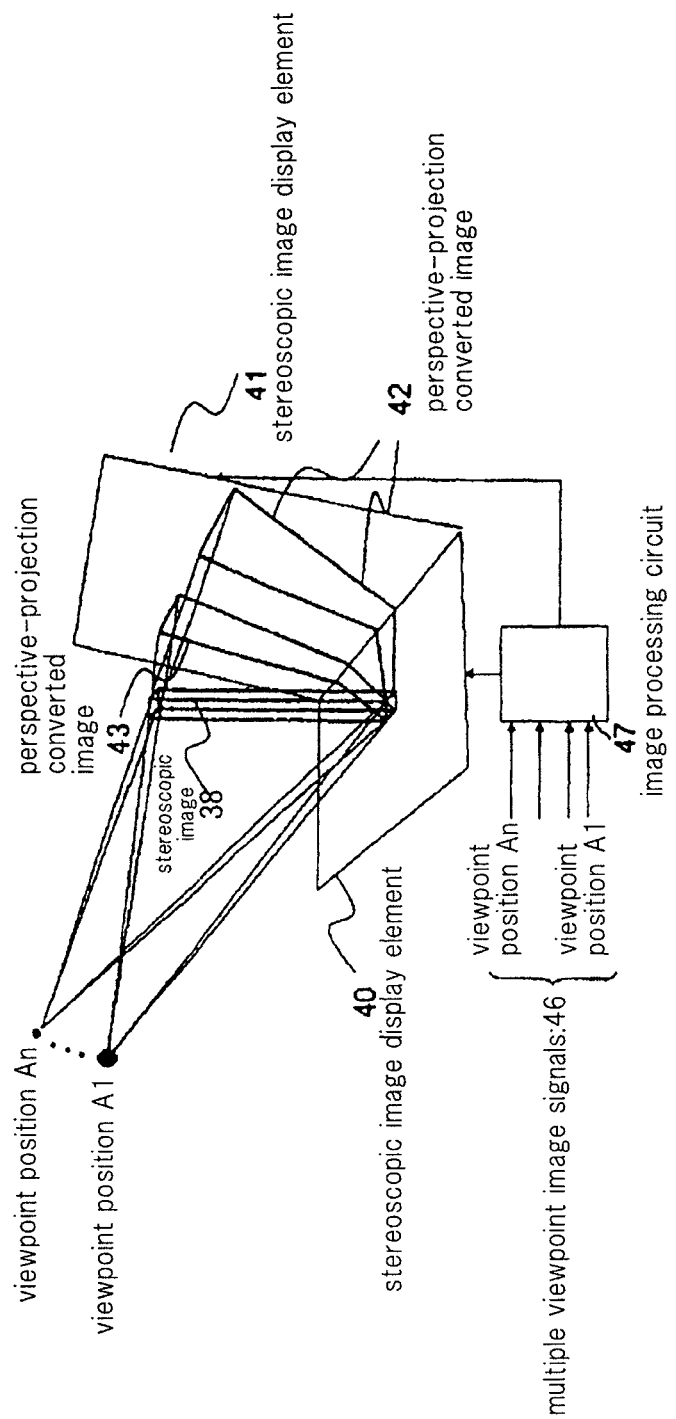
FIG. 14 is a schematic view for explaining the eighth exemplary embodiment of the image display device of the present invention.

FIG. 14 is a schematic view for explaining the eighth exemplary embodiment of the image display device of the present invention. The image display device of this embodiment is capable of stereoscopic image display at n viewpoints and includes two stereoscopic image display elements 40 and 41 that make up a display screen and image processing circuit 47.

Stereoscopic image display elements 40 and 41 are the same as stereoscopic image display elements 30 and 31 shown in FIG. 13. Image processing circuit 47 takes as input multiple viewpoint image signal 46 that relates to images corresponding to each of viewpoint positions A1-An, and based on this multiple viewpoint image signal 46, generates images of n viewpoints from perspective-projection converted image 43 of viewpoint position A1 to perspective-projection converted image 42 of viewpoint position An that correspond to each of stereoscopic image display elements 40 and 41. Lenticular lenses are adhered to each prism surface of stereoscopic image display elements 40 and 41, and a stereoscopic image is observed when viewed from each of the directions of viewpoint positions A1-An.

Explanation next regards an example in which the configuration of the sixth exemplary embodiment is applied as an actual example of the image display device of the present embodiment.

Color liquid crystal panels having 640 picture elements horizontally and 480 picture elements vertically for a screen size of 32 mm horizontally and 50 mm vertically were used as stereoscopic image display elements 40 and 41. The non-display portions of the stereoscopic image display elements were 1.8 mm. The lens pitch of the lenticular lenses was 50×nµm, and the number of lenses was 640/n. For example, when the number of viewpoints n is 4, the lens pitch is 200 µm and the number of lenses is 160. The prism is made up from transparent acrylic resin (refractive index: 1.49) having a thickness of 4 mm. The extreme end portions of the image display portions of the stereoscopic image display elements were set to 1.8 mm from the corners of the surface of the prism that is in contact with the image display elements. The surfaces of the channel provided at the bend portion of the prism (the portion that covers the non-display portions) were subjected to mirror processing, and the depth of the channel was set to 1.8 mm. When images corresponding to the viewpoints of each of viewpoint positions A1 and An were optically independently presented at a viewing angle of 45° under these conditions, stereoscopic vision was possible with the unaided eye and without need for wearing special glasses, and the viewer was able to perceive stereoscopic vision without awareness of the non-display portions (seams) of stereoscopic image display elements 40 and 41 that make up the display screen.

In addition, in the image display device of the present embodiment, image processing circuit 47 generated from multiple viewpoint image signal 46 images of n viewpoints from perspective-projection converted image 43 of viewpoint position A1 to perspective-projection converted image 42 of viewpoint position An corresponding to each of stereoscopic image display elements 40 and 41 to enable moving-picture display in real time of stereoscopic image 38 that was geometrically correct to the viewer.

The present embodiment enabled the presentation of a stereoscopic image to a viewer and enabled the provision of a stereoscopic display device having a high angle of view and realism.

In addition, the angle formed by the surface of the two stereoscopic image display elements may be an angle greater than 90° as long as the condition that the seam of images be optically invisible is maintained.

A parallax barrier, a lens array for integral photography, or a pinhole array may be used as the optics for realizing stereoscopic display.

In addition to a transparent acrylic resin, a polycarbonate resin having a high refractive index (refractive index: 1.59) may further be used in the prism.

The surfaces of the prism may be given an antireflection coating.

In addition to color liquid crystal panels, various types of flat display panels such as organic EL panels, plasma display panels, surface-conduction electron-emitter display panels, and electronic paper may be used as the stereoscopic image display elements. Still further, the number of picture elements and the screen size are not limited to those of the above-described example and can be set as appropriate according to design.

Ninth Exemplary Embodiment

Figure 15A:
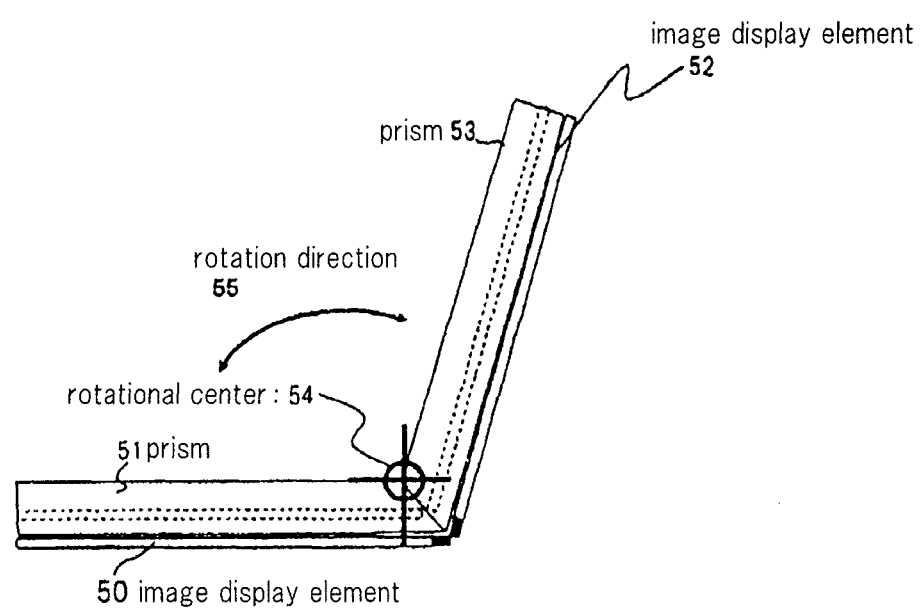
FIG. 15A is a schematic view for explaining the ninth exemplary embodiment of the image display device of the present invention and shows the state in which the panel is open.
Figure 15B:
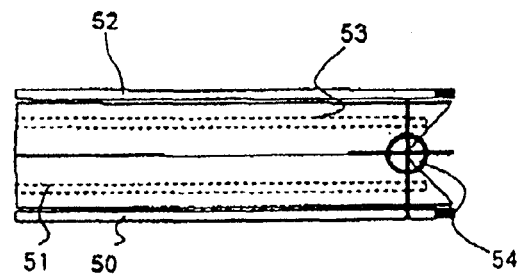
FIG. 15B is a schematic view for explaining the ninth exemplary embodiment of the image display device of the present invention and shows the state in which the panel is closed.

FIGS. 15A and 15B are schematic views for explaining the ninth exemplary embodiment of the image display device of the present invention. FIG. 15A shows the state in which the panels are open, and FIG. 15B shows the state in which the panels are closed. The image display device of the present embodiment includes image display elements 50 and 52, and prisms 51 and 53 that cover these image display elements 50 and 52, respectively. Image display element 50 and prism 51 are bonded together, image display element 52 and prism 53 are bonded together, and a mechanism (rotation means) is provided in which prisms 51 and 53 rotate in rotation direction 55 with the vicinity of the line of intersection of the prism surfaces of prisms 51 and 53 as the rotational center 54 and this rotational center 54 as an axis. These image display elements 50 and 52 and prisms 51 and 53 are identical to the components described in any of the first to sixth exemplary embodiments. The image processing circuit described in either of the seventh and eighth exemplary embodiments can be used as the image processing circuit.

In the image display device of the present embodiment, the panels can be opened as shown in FIG. 15A or closed as shown in FIG. 15B by rotating in rotation direction 55 with rotational center 54 as an axis. By means of this opening and closing mechanism of the panels, space saving can be realized when storing the image display device. In addition, the rotation means may include a mechanism by which the angle of the panels is secured at any angle or a mechanism for changing the angle of the panels in steps.

Tenth Exemplary Embodiment

Figure 16:
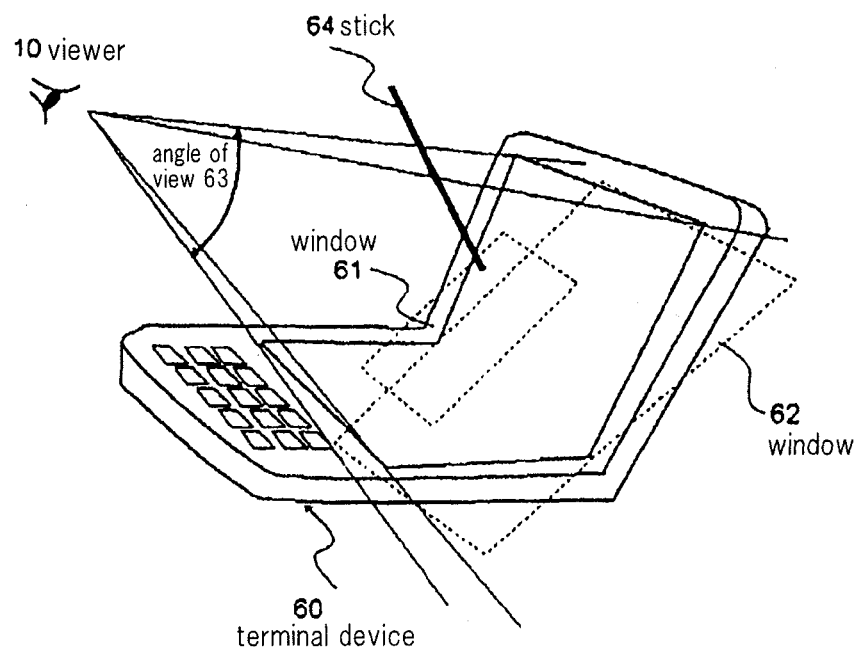
FIG. 16 is a schematic view for explaining the tenth exemplary embodiment of the image display device of the present invention.

FIG. 16 is a view for explaining the tenth exemplary embodiment of the image display device of the present invention. The image display device of the present embodiment is a terminal device in which the constructions described in the first to ninth exemplary embodiments can be applied and is a configuration capable of three-dimensional display.

Referring to FIG. 16, terminal device 60 is capable of displaying a planar image on each of two windows: window 61 and window 62 having a larger size than this window 61. Terminal device 60 includes: a sensor that uses, for example, ultrasonic waves or magnetism for detecting the position of stick 64 in three-dimensional space; and a control unit for accepting input from this sensor and controlling the display of images in windows 61 and 62; and is capable of input manipulation in window 61 or window 62 that uses stick 64. The control unit detects the coordinates of stick 64 in three-dimensional space based on the output of the sensor and realizes display processing based on the detection results. In this way, the display position, shape, and color of a stereoscopic image can be controlled in concert with the coordinates of stick 64. Input manipulation that uses a stick is generally known as a pointing device.

Eleventh Exemplary Embodiment

Figure 17A:
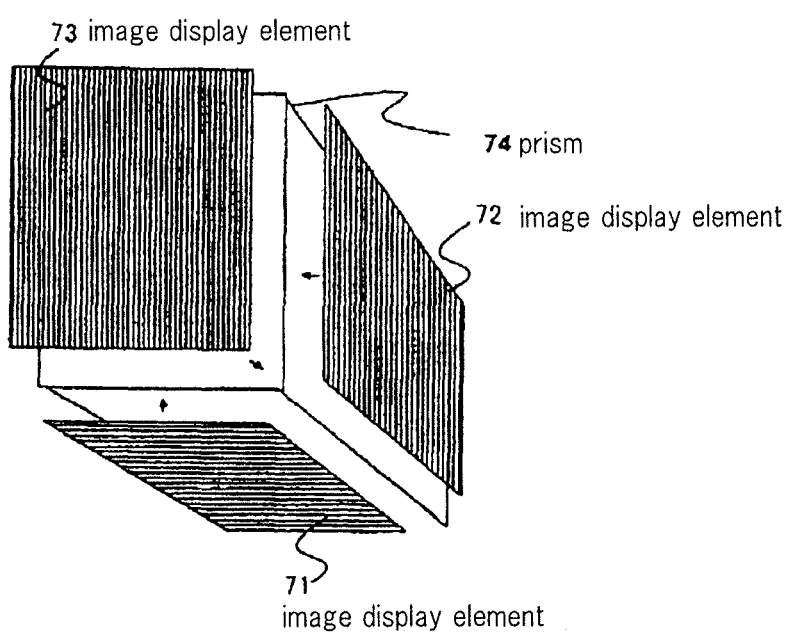
FIG. 17A is a perspective view for explaining the eleventh exemplary embodiment of the image display device of the present invention.
Figure 17B:
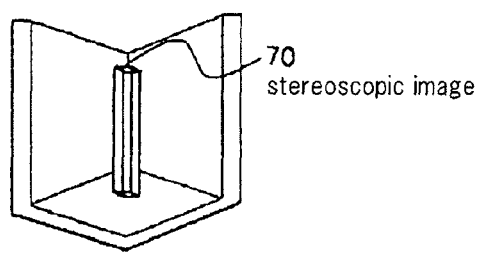
FIG. 17B is a schematic view of the three-dimensional display in the image display device shown in FIG. 17A.

FIG. 17A is a perspective view for explaining the eleventh exemplary embodiment of the image display device of the present invention. FIG. 17B is a schematic view of the three-dimensional display in this image display device. As shown in FIG. 17A, the image display device of the present embodiment is made up from three image display elements 71-73 and prism 74 that covers these image display elements 71-73. Image display element 71 is arranged on the bottom surface, and image display elements 72 and 73 are arranged on each of two adjacent side surfaces that are perpendicular to the bottom surface. Prism 74 is provided with first to third prism parts that cover image display elements 71-73, respectively. The configuration of the first prism part and image display element 71, the configuration of the second prism part and image display element 72, and the configuration of the third prism part and image display element 73 are each the same as the form of any of the first to sixth exemplary embodiments.

According to the image display device of the present embodiment, each image formed by image display elements 71-73 is viewed as one continuous stereoscopic image 70 as shown in FIG. 17B, and the non-display portions of image display elements 71-73 are not viewed. According to observation of stereoscopic image 70 that uses three image display elements of this type, stereoscopic images can be presented with greater realism and a wider angle of view than a device in which the display screen is made up from two image display elements. In addition, the number of image display elements in the example shown in FIG. 17A may be four or more.

Twelfth Exemplary Embodiment

Figure 18A:
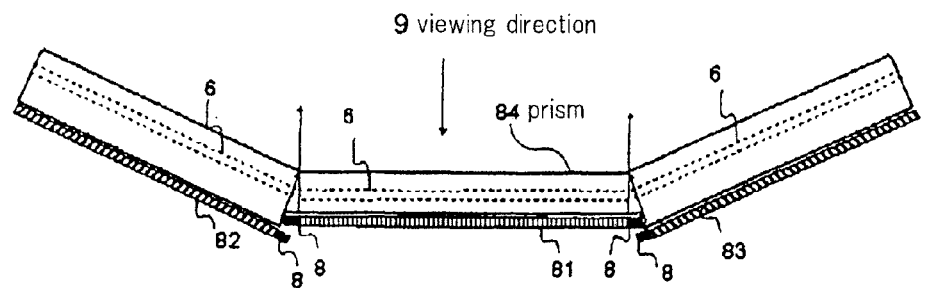
FIG. 18A is an upper plan view showing the twelfth exemplary embodiment of the image display device of the present invention.
Figure 18B:
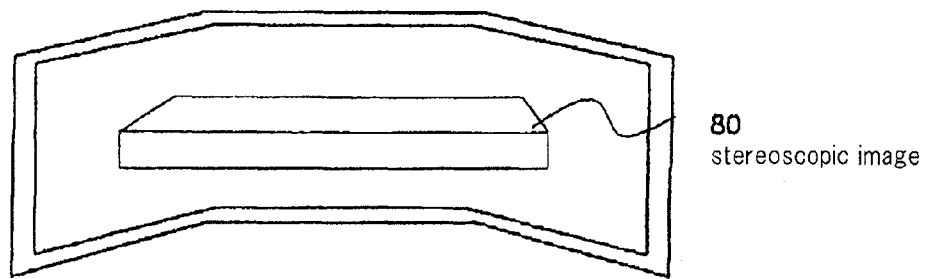
FIG. 18B is a schematic view of stereoscopic display in the image display device shown in FIG. 18A.

FIG. 18A is an upper plan view for explaining the twelfth exemplary embodiment of the image display device of the present invention. FIG. 18B is a schematic view of stereoscopic display in this image display device. As shown in FIG. 18A, the image display device of this embodiment is made up from three image display elements 81-83 and prism 84 that covers these image display elements 81-83. Image display elements 82 and 83 are arranged on the two sides of image display element 81. Prism 84 is provided with first to third prism parts for covering image display elements 81-83, respectively. The configuration of the first prism part and image display element 81, the configuration of the second prism part and image display element 82, and the configuration of the third prism part and image display element 83 are all the same form as any of the first to sixth exemplary embodiments.

According to the image display device of the present embodiment, the images formed by each of image display elements 81-83 are viewed as one continuous stereoscopic image 80 as shown in FIG. 18B and each of the non-display portions 8 of image display elements 81-83 are not seen. According to observation of stereoscopic image 80 that uses these three image display elements, a stereoscopic image can be presented with even greater realism and wider angle of view than a device in which the display screen is composed of two image display elements. In addition, the number of image display elements in the example shown in FIG. 18A may be four or more.

Thirteenth Exemplary Embodiment

Figure 19:
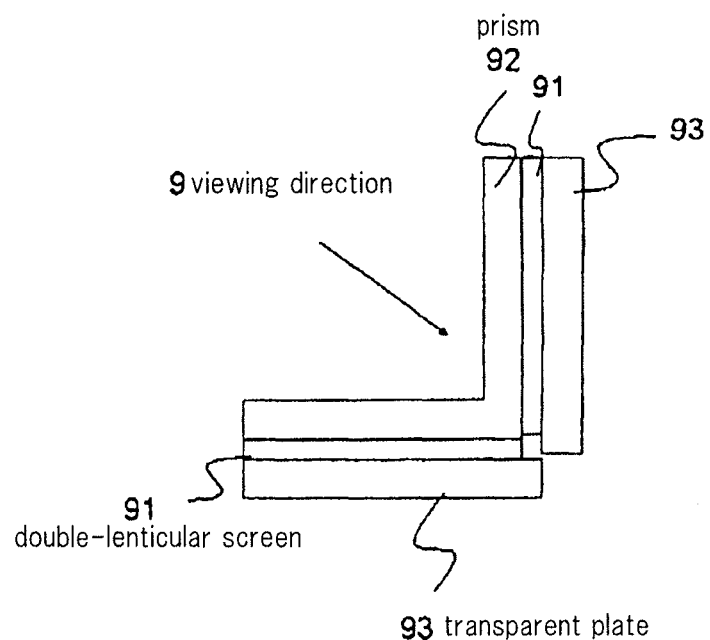
FIG. 19 is a schematic view for explaining the thirteenth exemplary embodiment of the image display device of the present invention.

FIG. 19 is a schematic view for explaining the thirteenth exemplary embodiment of the image display device of the present invention. The image display device of the present embodiment includes: two double-lenticular screens 91 arranged in proximity such that the angle formed by the surfaces is 90°; prism 92 having an L-shaped cross section for covering these double-lenticular screens; and transparent plates 93 for pressing double-lenticular screens 91 against prism 92. Double-lenticular screens 91 are secured by being sandwiched between prism 92 and transparent plates 93.

The image display device of the present embodiment is a projection-type three-dimensional display device that employs double-lenticular screens as the image display elements, and the positional relation of double-lenticular screens 91 and prism 92 is the same as the positional relation of the image display elements and prism in any of the first to sixth exemplary embodiments.

Figure 20:
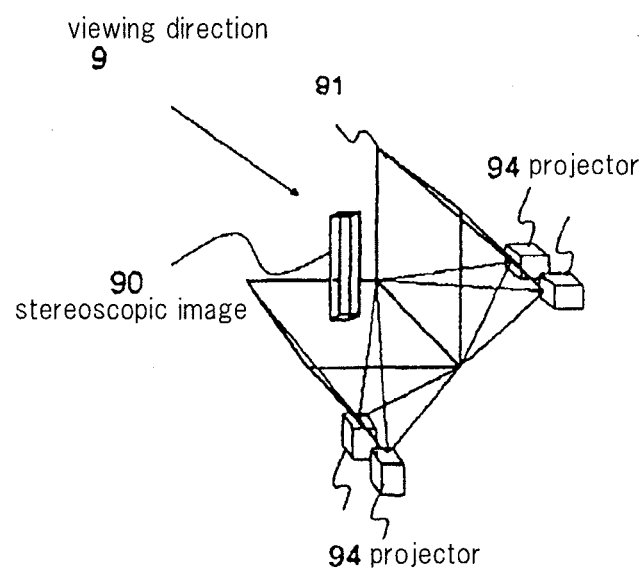
FIG. 20 is a schematic view showing stereoscopic display that uses the image display device of the present embodiment.

FIG. 20 gives a schematic representation of stereoscopic display that uses the image display device of the present embodiment. Four projectors are used. Images (perspective-projection converted images) corresponding to different viewpoint positions are displayed by two projectors onto one double-lenticular screen 91, and images (perspective-projection converted images) corresponding to different viewpoint positions are displayed by the remaining two projectors onto the other double-lenticular screen 91. When the image formed on each double-lenticular screen 91 is viewed from viewing direction 9, one continuous stereoscopic image 90 can be viewed without any seam of the images.

Degradation of the stereoscopic image resulting from curvature of the double-lenticular screens can be decreased by using, for example, glass having a high degree of flatness as transparent plate 93, and then firmly clasping and securing each double-lenticular screen 91 by transparent plates 93 and prism 92.

The invention claimed is:
1. An image display device comprising:
first and second image display elements; and
a prism which is arranged on both of said first image display element and said second image display element,
wherein a first plane, which contains said a surface of first image display element, and a second plane, which contains a surface of said second image display element, intersect each other; and wherein
said first image display element includes a first image display portion and a first non-display portion which is provided at an end of said first image display element; and said second image display element includes a second image display portion and a second non-display portion which is provided at an end of said second image display element.

2. An image display device according to claim 1, wherein: said prism includes a first prism layer which is arranged on at least said first non-display portion of said first image display element and a second prism layer which is arranged on at least said second non-display portion of said second image display element.

3. An image display device according to claim 1, wherein: said first prism layer includes first and second surfaces, the first surface being arranged on the side of said first image display element, and the second surface being arranged on the opposite side to the first surface and being parallel to an upper surface of said first image display element, and said second prism layer includes third and fourth surfaces, the third surface being arranged on the side of said second image display element, and the fourth surface being arranged on the opposite side to the third surface and being parallel to an upper surface of said second image display element.

4. An image display device according to claim 3, wherein: one end of said first prism layer, on which said first non-display portion of said first image display element is located, and one end of said second prism layer, on which said second non-display portion of said second image display element is located, are joined.

5. An image display device according to claim 4, wherein: said first and second planes form an angle of 90°.

6. An image display device according to claim 5, wherein: when viewed in a direction perpendicular to a plane which is perpendicular to both the upper surface of said first image display element and the upper surface of said second image display element, a length of said first non-display portion is smaller than a thickness of said second prism layer and a length of said second non-display portion is smaller than a thickness of said first prism layer.

7. An image display device according to claim 5, wherein: said first non-display portion of said first image display element is provided adjacent to said second non-display portion of said second image display element.

8. An image display device according to claim 4, wherein, when viewed in a direction perpendicular to a plane which is perpendicular to both the upper surface of said first image display portion and the upper surface of said second image display portion:

a first point is set on a line in which said first surface of said first prism layer and said third surface of said second prism layer intersect each other;

a second point is set on a line in which said second surface of said first prism layer and said fourth surface of said second prism layer intersect each other;

a first distance between said first point and a boundary of said first image display and said first non-display portion is smaller than a second distance between said first point and an intersection point at which said first image display element and a line intersects each other, the line being perpendicular to the upper surface of said first image display element and being drawn from said second point; and a third distance between said first point and a boundary of said second image display and said second non-display portion is smaller than a fourth distance between said first point and a intersection point at which said second image display element and a line intersects each other, the line being perpendicular to the upper surface of said second image display element and being drawn from said second point.

9. An image display device according to claim 4, further comprising a channel which is formed in a joint portion at which said first surface of said first prism layer and said third surface of said second prism layer is joined.

10. An image display device according to claim 9, wherein: when viewed in a direction perpendicular to a plane which is perpendicular to both the upper surface of said first image display portion and the upper surface of said second image display portion, a cross-sectional shape of said channel is an L-shape.

11. An image display device according to claim 9, wherein said channel includes a diffusing surface in which incident light is diffused.

12. An image display device according to claim 9, wherein said channel includes a curved surface.

13. An image display device according to claim 1, wherein: picture elements which are provided at the end of said first image display portion are picture elements which are located inward from picture elements on the extreme end of said first image display portion, and picture elements which are provided at the end of said second image display portion are picture elements which are located inward from picture elements on the extreme end of said second image display portion.

14. An image display device according to claim 1, wherein the refractive index is uniform in said first and second prism layers.

* * * * *